United States Patent
Azuma et al.

(10) Patent No.: US 12,181,439 B2
(45) Date of Patent: Dec. 31, 2024

(54) GAS SENSOR

(71) Applicant: DENSO CORPORATION, Kariya (JP)

(72) Inventors: Kazunari Azuma, Kariya (JP); Yusuke Kawamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 720 days.

(21) Appl. No.: 17/389,966

(22) Filed: Jul. 30, 2021

(65) Prior Publication Data

US 2021/0364465 A1    Nov. 25, 2021

Related U.S. Application Data

(63) Continuation of application No. PCT/JP2019/050735, filed on Dec. 25, 2019.

(30) Foreign Application Priority Data

Jan. 31, 2019  (JP) ................ 2019-016215

(51) Int. Cl.
   *G01N 27/41*    (2006.01)
   *G01N 27/409*   (2006.01)
   *G01N 27/419*   (2006.01)

(52) U.S. Cl.
   CPC ......... *G01N 27/419* (2013.01); *G01N 27/409* (2013.01); *G01N 27/41* (2013.01)

(58) Field of Classification Search
   CPC ............. G01N 27/419; G01N 27/4065; G01N 33/0006
   See application file for complete search history.

(56) References Cited

U.S. PATENT DOCUMENTS

| | | |
|---|---|---|
| 2001/0039825 A1 | 11/2001 | Kurokawa et al. |
| 2002/0104758 A1 | 8/2002 | Mizutani et al. |
| 2005/0040041 A1 | 2/2005 | Sakayanagi |
| 2017/0219513 A1* | 8/2017 | Kayama ............ G01N 27/4065 |
| 2018/0284053 A1* | 10/2018 | Watanabe .......... G01N 27/4071 |

FOREIGN PATENT DOCUMENTS

| | | |
|---|---|---|
| JP | 2002-116180 | 4/2002 |
| JP | 4077229 | 2/2008 |

* cited by examiner

*Primary Examiner* — Alexander S Noguerola
(74) *Attorney, Agent, or Firm* — Nixon & Vanderhye P.C.

(57) ABSTRACT

A gas sensor includes a measurement chamber, a reference gas chamber, a first cell that includes a first electrode in the measurement chamber and a second electrode in the reference gas chamber, and a second cell that includes a third electrode in the measurement chamber and a fourth electrode in the reference gas chamber. The gas sensor detects a first current that flows through the first cell, detects a second current that flows through the second cell, calculates a concentration of a specific gas component based on a detected value of the second current, determines whether a change has occurred in an oxygen concentration in the reference gas chamber based on a detected value of the first current, and corrects the detected value of the second current when the gas sensor determines that a change has occurred in the oxygen concentration in the reference gas chamber.

13 Claims, 13 Drawing Sheets

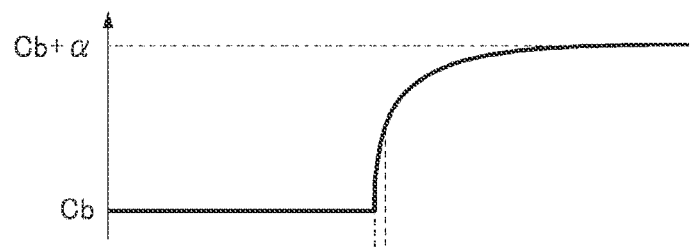
FIG. 13A  OXYGEN CONCENTRATION
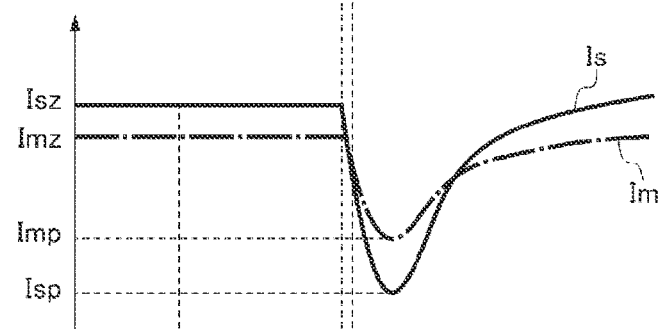
FIG. 13B  CURRENT
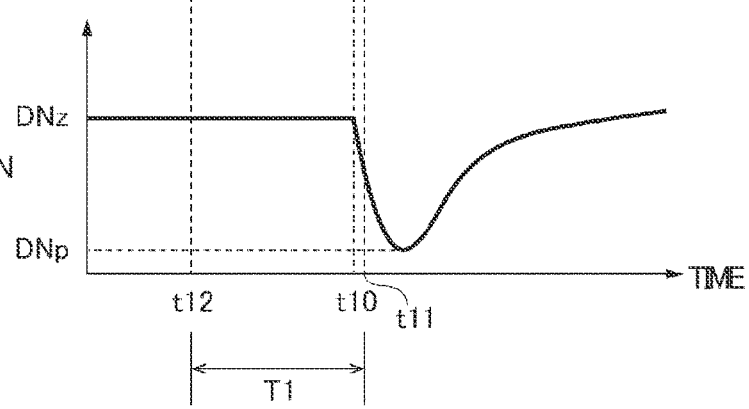
FIG. 13C  DETECTED VALUE OF NOx CONCENTRATION DN

GAS SENSOR

CROSS-REFERENCE TO RELATED APPLICATIONS

The present application is a continuation application of International Application No. PCT/JP2019/050735, filed Dec. 25, 2019, which claims priority to Japanese Patent Application No. 2019-016215, filed on Jan. 31, 2019. The contents of these applications are incorporated herein by reference in their entirety.

BACKGROUND

Technical Field

The present disclosure relates to a gas sensor.

Related Art

A gas sensor with a measurement chamber into which exhaust gas is introduced is known. The measurement chamber is formed as a space that is sandwiched between a first solid electrolyte body and a second solid electrolyte body. The gas sensor includes a pump cell and a a sensor cell. In the pump cell, a current flows which depend on a concentration of oxygen while oxygen in the exhaust gas introduced into the measurement chamber is discharged into the atmosphere. In the sensor cell, a current flows which depends on a concentration of nitrogen oxides from gas components after the oxygen is discharged.

SUMMARY

One aspect of the present disclosure provides a gas sensor that includes a measurement chamber, a reference gas chamber, a first cell that includes a first electrode provided in the measurement chamber and a second electrode provided in the reference gas chamber, and a second cell that includes a third electrode provided in the measurement chamber and a fourth electrode provided in the reference gas chamber. The gas sensor detects a first current that flows through the first cell, detects a second current that flows through the second cell, calculates a concentration of a specific gas component based on a detected value of the second current, determines whether a change has occurred in an oxygen concentration in the reference gas chamber based on a detected value of the first current, and corrects the detected value of the second current when the determining unit determines that a change has occurred in the oxygen concentration in the reference gas chamber.

BRIEF DESCRIPTION OF THE DRAWINGS

In the accompanying drawings:

FIGS. 13A, 13B and 13C are timing charts respectively illustrating transitions in the oxygen concentration in the reference gas chamber, the detected value of the sensor current, a detected 5 value of a monitor current, and the detected value of NOx concentration.

DESCRIPTION OF THE EMBODIMENTS

Figure 1:
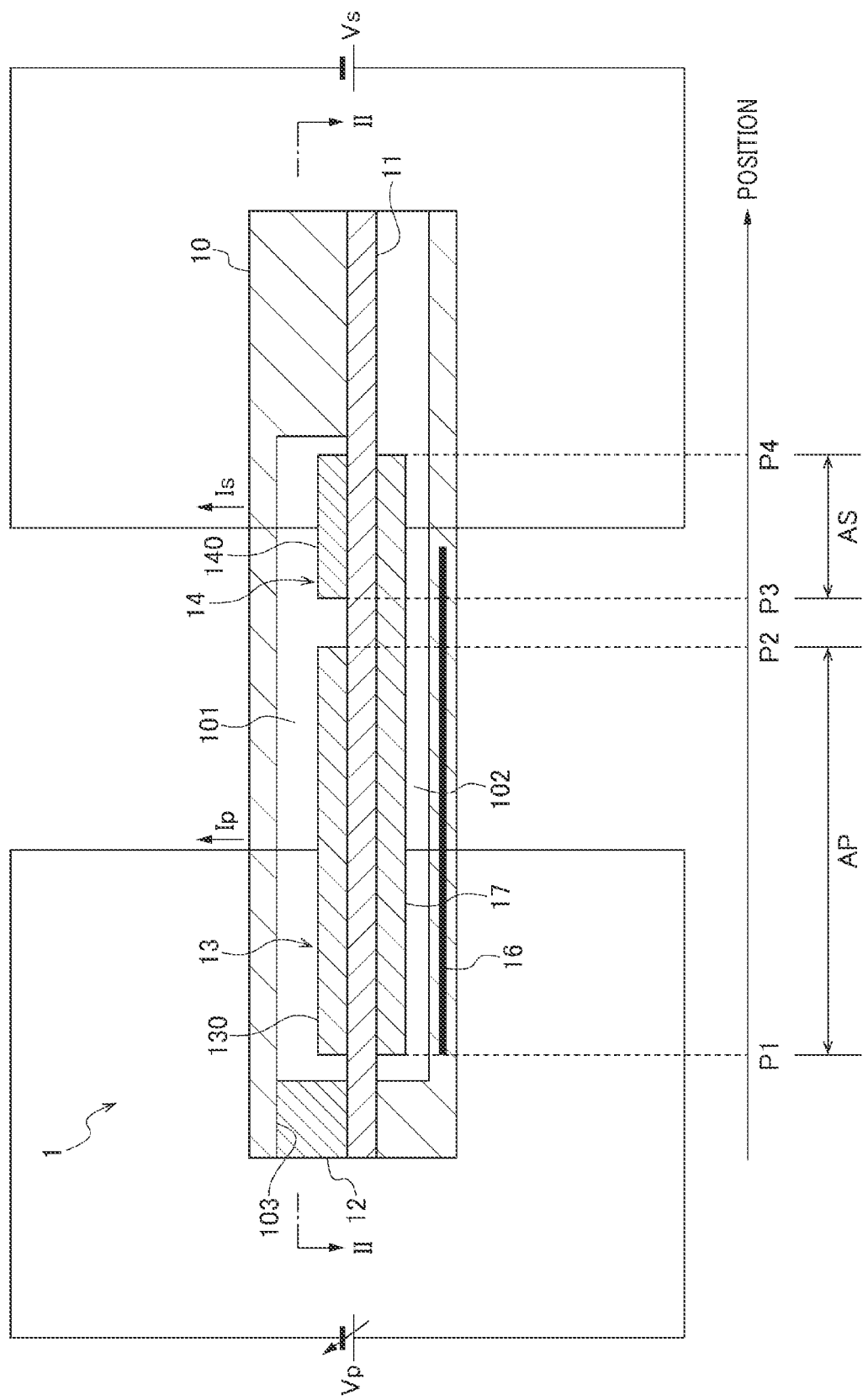
FIG. 1 is a cross-sectional view of a structure of a gas sensor according to a first embodiment.

JP-A-2002-116180 describes a gas sensor that is provided with a measurement chamber into which exhaust gas is introduced. The measurement chamber is formed as a space that is sandwiched between a first solid electrolyte body and a second solid electrolyte body. The gas sensor described in JP-A-2002-116180 includes a pump cell through which a current flows which depends on a concentration of oxygen while oxygen in the exhaust gas that is introduced into the measurement chamber is discharged into the atmosphere, and a sensor cell through which a current flows which depends on a concentration of nitrogen oxides from gas components after the oxygen is discharged.

The pump cell is configured by the first solid electrolyte body, a pump electrode that is provided on one surface of the first solid electrolyte body that faces the measurement chamber, and a reference electrode that is provided on another surface of the first solid electrolyte body. The sensor cell includes the second solid electrolyte body, a sensor electrode that is provided on one surface of the second solid electrolyte body that faces the measurement chamber, and a reference electrode that is provided on another surface of the second solid electrolyte body. The reference electrode of the sensor cell is arranged in a reference gas chamber into which atmospheric air is introduced.

The gas sensor described in JP-A-2002-116180 further includes a control circuit that detects respective currents that flow through the pump cell and the sensor cell. In the sensor cell, oxygen concentration dependence in which the current of the sensor cell changes based on changes in the oxygen concentration in the exhaust gas is present. To resolve the oxygen concentration dependence of the current of the sensor cell, in the control circuit, the current of the sensor cell is corrected based on a pump current that flows through the pump cell. In the gas sensor described in JP-A-2002-116180, the concentration of nitrogen oxides is detected based on the corrected current of the sensor cell.

In the gas sensor described in JP-A-2002-116180, only the reference electrode of the sensor cell is arranged in the reference gas chamber. However, the reference electrode of the pump cell and the reference electrode of the sensor cell may both be arranged in the reference gas chamber. However, when such a structure is used in the gas sensor, an issue such as that below may arise.

When the reference electrode of the pump cell is arranged in the reference gas chamber, the oxygen in the exhaust gas is discharged into the reference gas chamber by the pump cell. Therefore, when the oxygen concentration in the exhaust gas suddenly changes, the oxygen concentration in the reference gas chamber also suddenly changes. As a result, the oxygen concentration in the reference gas chamber may become higher than an actual oxygen concentration in atmospheric air.

When the oxygen concentration in the reference gas chamber increases in this manner, changes occur in an electromotive force that is generated between the sensor electrode and the reference electrode. Electric charge based on electrostatic capacitances of the sensor electrode and the reference electrode is stored between the sensor electrode and the reference electrode. When the electromotive force that is generated between the sensor electrode and the reference electrode changes, a change also occurs in the electric charge that is stored between the sensor electrode and the reference electrode. This becomes a factor in the current of the sensor cell being changed. Changes occurs in the current of the sensor cell due to changes in the oxygen concentration in the reference gas chamber in this manner. Changes also occur in a detected value of concentration of nitrogen oxides. This becomes a factor in an error occurring in the detected value of concentration of nitrogen oxides.

It is thus desired to provide a gas sensor that is capable of detecting a concentration of a specific gas component with higher accuracy.

A first exemplary embodiment of the present disclosure provides a gas sensor that includes a measurement chamber, a reference gas chamber, a first cell, a first current detecting unit, a second cell, a second current detecting unit, a calculating unit, a determining unit, and a correcting unit. Exhaust gas is introduced into the measurement chamber. A reference gas is introduced into the reference gas chamber.

The first cell includes a first electrode that is provided in the measurement chamber and a second electrode that is provided in the reference gas chamber, and removes oxygen that is contained in the exhaust gas that is introduced into the measurement chamber by a voltage being applied between the first electrode and the second electrode.

The second cell includes a third electrode that is provided in the measurement chamber and a fourth electrode that is provided in the reference gas chamber, in which a voltage is applied between the third electrode and the fourth electrode, and through which a second current flows which depends on a concentration of a specific gas component that is contained in the exhaust gas from which oxygen has been removed by the first cell.

The first current detecting unit detects a value of a first current that flows between the first electrode and the second electrode. The second current detecting unit detects a value of the second current. The calculating unit calculates the concentration of the specific gas component based on a detected value of the second current detected by the second current detecting unit. The determining unit determines whether a change has occurred in an oxygen concentration in the reference gas chamber based on a detected value of the first current detected by the first current detecting unit. The correcting unit corrects the detected value of the second current when the determining unit determines that a change has occurred in the oxygen concentration in the reference gas chamber.

In this configuration, the detected value of the second current is corrected when a change occurs in the oxygen concentration in the reference gas chamber. This makes it possible to reduce an influence of changes in the oxygen concentration in the reference gas chamber on the detected value of the second current. The concentration of the specific gas component is calculated based on the corrected detected value of the second current. Thus, the concentration of the specific gas component can be detected with higher accuracy.

A second exemplary embodiment of the present disclosure provides a gas sensor that includes a measurement chamber, a reference gas chamber, a first cell, a second cell, a third cell, a first current detecting unit, a second current detecting unit, a third current detecting unit, a calculating unit, a determining unit, and a correcting unit. Exhaust gas is introduced into the measurement chamber. A reference gas is introduced into the reference gas chamber.

The first cell includes a first electrode that is provided in the measurement chamber and a second electrode that is provided in the reference gas chamber, and removes oxygen that is contained in the exhaust gas that is introduced into the measurement chamber by a voltage being applied between the first electrode and the second electrode.

The second cell includes a third electrode that is provided in the measurement chamber and a fourth electrode that is provided in the reference gas chamber, in which a voltage is applied between the third electrode and the fourth electrode, and through which a second current flows which depends on a concentration of a specific gas component that is contained in the exhaust gas from which oxygen has been removed by the first cell.

The third cell includes a fifth electrode that is provided in the measurement chamber and a sixth electrode that is provided in the reference gas chamber, through which a third current flows which depends on a concentration of residual oxygen that is contained in the exhaust gas from which oxygen has been removed by the first cell by a voltage being applied between the fifth electrode and the sixth electrode.

The first current detecting unit detects a first current that flows between the first electrode and the second electrode. The second current detecting unit detects the second current. The third current detecting unit detects the third current. The calculating unit calculates the concentration of the specific gas component based on a detected value of the second current detected by the second current detecting unit and a detected value of the third current detected by the third current detecting unit. The determining unit determines whether a change has occurred in an oxygen concentration in the reference gas chamber based on a detected value of the first current detected by the first current detecting unit. The correcting unit corrects at least either of the detected value of the second current and the detected value of third current when the determining unit determines that a change has occurred in the oxygen concentration in the reference gas chamber.

In this configuration, because at least either of the detected value of the second current and the detected value of third current is corrected when a change occurs in the oxygen concentration in the reference gas chamber, effects that changes in the oxygen concentration in the reference gas chamber have on at least either of the detected value of the second current and the detected value of the third current can be reduced. Consequently, as a result of the concentration of the specific gas component being calculated based on the corrected detected value of the second current and the detected value of the third current, the concentration of the specific gas component can be detected with higher accuracy.

Embodiments of a gas sensor will hereinafter be described with reference to the drawings. To facilitate understanding of the descriptions, identical constituent elements in the drawings are given the same reference numbers as much as possible, and redundant descriptions are omitted.

First Embodiment

First, a gas sensor 1 according to a first embodiment shown in FIG. 1 will be described. For example, the gas sensor 1 shown in FIG. 1 is arranged in an exhaust passage of a vehicle. An exhaust purification apparatus that purifies harmful substances such as carbon monoxide and nitrogen oxides that are contained in exhaust gas that is discharged from an internal combustion engine is provided in the exhaust passage. The gas sensor 1 detects a concentration of nitrogen oxides that are contained in the exhaust gas that passes through the exhaust purification apparatus, and outputs a signal based on the detected concentration of nitrogen oxides. Hereafter, the nitrogen oxides are also referred to as $NO_X$. According to the present embodiment, $NO_X$ corresponds to a specific gas component that is contained in the exhaust gas.

As shown in FIG. 1, the gas sensor 1 includes a main body portion 10, a solid electrolyte body 11, a diffusion resistance body 12, a pump cell 13, a sensor cell 14, and a heater 16.

The main body portion 10 is arranged so as to sandwich the solid electrolyte body 11 in a thickness direction with predetermined gaps therebetween. One gap that is formed between the main body portion 10 and the solid electrolyte body 11 forms a measurement chamber 101. An introduction hole 103 that passes through to the measurement chamber 101 from an outer peripheral surface of the main body portion 10 is formed in the main body portion 10. Another gap that is formed between the main body portion 10 and the solid electrolyte body 11 forms a reference gas chamber 102. Atmospheric air that serves as a reference oxygen concentration gas is introduced into the reference gas chamber 102 through an atmosphere opening that is provided in the gas sensor.

The diffusion resistance body 12 is arranged in the introduction hole 103. The diffusion resistance body 12 is composed of a porous member such as alumina or a member that has fine pores. The diffusion resistance body 12 is provided to restrict an amount of exhaust gas that is introduced into the measurement chamber 101.

The pump cell 13 is arranged in a position closer to the introduction hole 103 than the sensor cell 14. The pump cell 13 removes oxygen in the exhaust gas that is introduced from the introduction hole 103. According to the present embodiment, the pump cell 13 corresponds to a first cell.

The pump cell 13 is configured by the solid electrolyte body 11, a pump electrode 130 that is arranged on a surface of the solid electrolyte body 11 on the measurement chamber 101 side, and a common electrode 17 that is arranged on a surface of the solid electrolyte body 11 on the reference gas chamber 102 side. The pump electrode 130 is configured by an $NO_X$ inactive electrode that does not easily decompose $NO_X$, such as an electrode that is composed of a Pt—Au (platinum-gold) alloy. The common electrode 17 is arranged so as to extend to an area that corresponds to the sensor cell 14. A pump voltage Vp is applied between the pump electrode 130 and the common electrode 17. According to the present embodiment, the pump cell 13 corresponds to the first cell. The pump electrode 130 corresponds to a first electrode. The common electrode 17 corresponds to a second electrode.

The exhaust gas that is introduced into the measurement chamber 101 through the introduction hole 103 comes into contact with the pump electrode 130. When the oxygen in the exhaust gas comes into contact with the pump electrode 103, oxygen ions are generated in the pump electrode 130. The oxygen ions flow inside the solid electrolyte body 11 towards the common electrode 17, release electric charge in the common electrode 17, and become oxygen. The oxygen is released into the atmosphere from the reference gas chamber 102. A pump current Ip flows between the pump electrode 130 and the common electrode 17 based on a flow of electric charge at this time. Therefore, the pump current Ip indicates an amount of removal of oxygen in the pump cell 13, or in other words, a value that is based on the oxygen concentration in the exhaust gas. According to the present embodiment, the pump current Ip corresponds to a first current.

Figure 2:
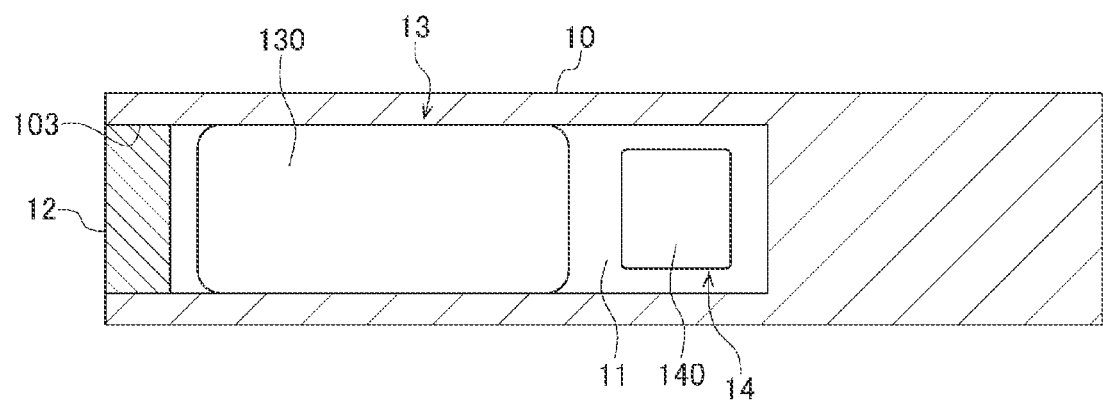
FIG. 2 is a cross-sectional view of a structure taken along line II-II in FIG. 1.

As shown in FIG. 2, the sensor cell 14 is arranged in a position farther away from the introduction hole 103 than the pump cell 13. The sensor cell 14 detects a $NO_X$ concentration in the exhaust gas that passes through the pump cell 13. According to the present embodiment, the sensor cell 14 corresponds to a second cell.

As shown in FIG. 1, the sensor cell 14 is configured by the solid electrolyte body 11, a sensor electrode 140 that is arranged on the surface of the solid electrolyte body 11 on the measurement chamber 101 side, and the common electrode 17. The sensor electrode 140 is configured by an $NO_X$ active electrode that easily decomposes $NO_X$, such as an electrode that is composed of a Pt—Rh (platinum-rhodium) alloy. A sensor voltage Vs is applied between the sensor electrode 140 and the common electrode 17. According to the present embodiment, the sensor cell 14 corresponds to the second cell. The sensor electrode 140 corresponds to a third electrode. The common electrode 17 corresponds to a fourth electrode.

The exhaust gas that has passed through the pump electrode 130, that is, the exhaust gas from which oxygen has been removed comes into contact with the sensor electrode 140. As a result of the $NO_X$ in the exhaust gas coming into contact with the sensor electrode 140, the $NO_X$ is decomposed into nitrogen and oxygen in the sensor electrode 140.

As a result of the oxygen that is decomposed in the sensor electrode 140 coming into contact with the sensor electrode 140, oxygen ions are generated in the sensor electrode 140. The oxygen ions flow inside the solid electrolyte body 11 towards the common electrode 17, releases electric charge in the common electrode 17, and becomes oxygen. The oxygen is released into the atmosphere from the reference gas chamber 102. A sensor current Is flows between the sensor electrode 140 and the common electrode 17 based on a flow of electric charge at this time. Therefore, the sensor current Is indicates a value that is based on the $NO_X$ concentration in the exhaust gas. According to the present embodiment, the sensor current Is corresponds to a second current.

In this manner, in the gas sensor 1 according to the present embodiment, the common electrode 17 is provided as respective electrodes of the pump cell 13 and the sensor cell 14 that are arranged in the reference gas chamber 102.

The heater 16 is provided inside the main body portion 10. The heater 16 heats the solid electrolyte body 11 by generating heat based on energization, and holds a temperature of the solid electrolyte body 11 to an activation temperature.

Figure 3:
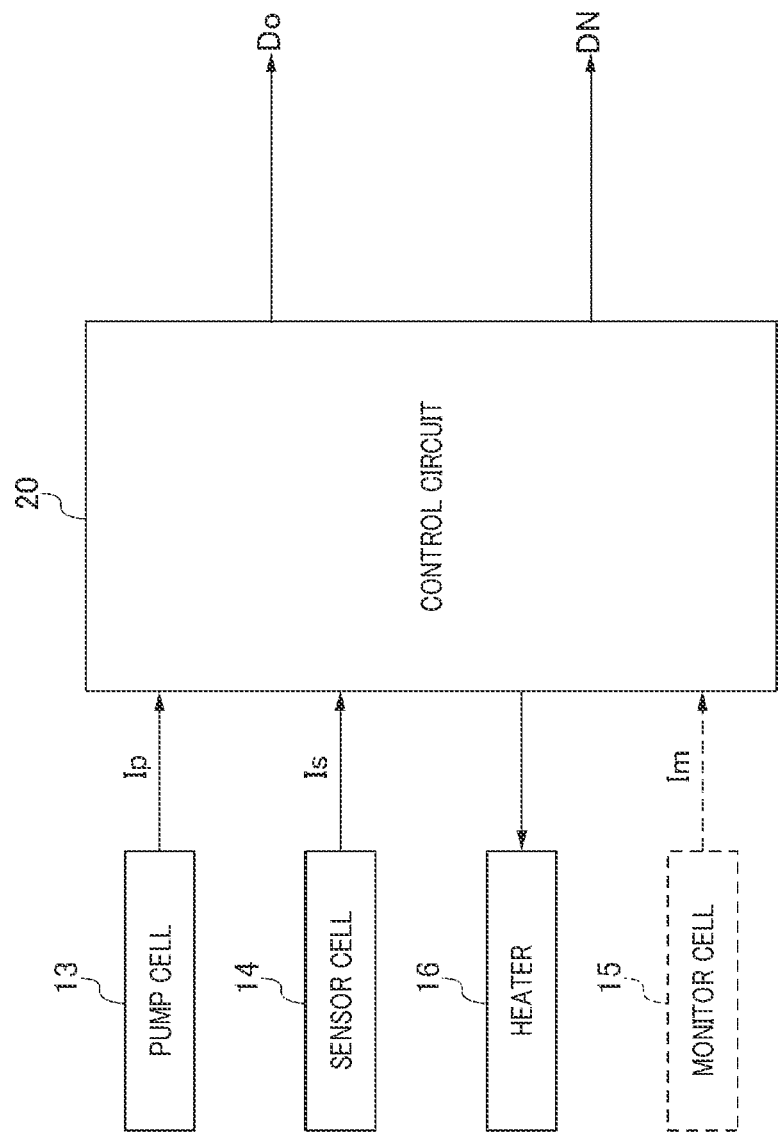
FIG. 3 is a block diagram illustrating an electrical configuration of the gas sensor according to the first embodiment.

As shown in FIG. 3, the gas sensor 1 further includes a control circuit 20 that oversees various calculation processes, driving control of the heater 16, and the like. For example, the control circuit 20 performs calculations of a detected value of oxygen concentration DO and a detected value of $NO_X$ concentration DN as the various calculation processes. Specifically, the pump current Ip that is outputted from the pump cell 13 and the sensor current Is that is outputted from the sensor cell 14 are taken into the control circuit 20. The control circuit 20 detects the pump current Ip that is outputted from the pump cell 13 and the sensor current Is that is outputted from the sensor cell 14.

A detected current of the pump current Ip detected by the control circuit 20 has a correlation with the oxygen concentration in the exhaust gas. A detected value of the sensor current Is detected by the control circuit 20 has a correlation with the $NO_X$ concentration in the exhaust gas. Using the foregoing, the control circuit 20 calculates the detected value of oxygen concentration DO based on the detected value of the pump current Ip and the detected value of $NO_X$ concentration DN based on the detected value of the sensor current Is. The control circuit 20 outputs the calculated detected value of oxygen concentration DO and the detected value of $NO_X$ concentration DN to a control apparatus that is mounted in the vehicle, such as a control apparatus that controls the internal combustion engine of the vehicle.

Figure 4:
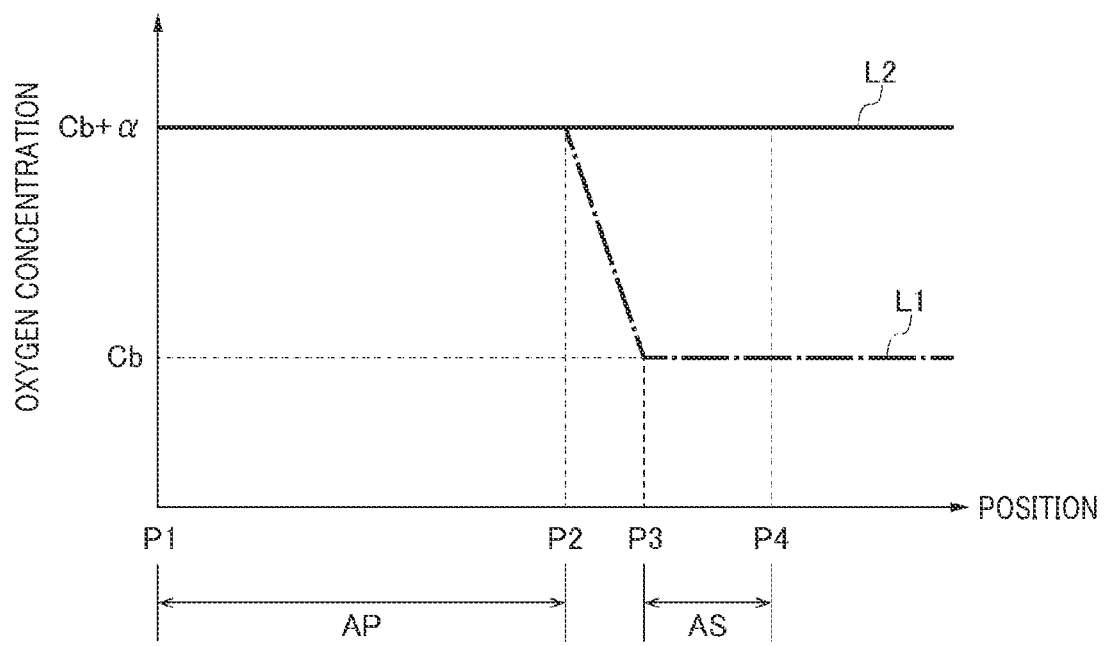
FIG. 4 is a graph illustrating a relationship between positions P1 to P4 shown in FIG. 1 and an oxygen concentration in a reference gas chamber.

Here, in the gas sensor 1 that has a configuration such as that described above, for example, in cases such as when fuel-cut control is performed in the internal combustion engine, the oxygen concentration in the exhaust gas that is introduced into the measurement chamber 101 may suddenly change. When the oxygen concentration in the exhaust gas that is introduced into the measurement chamber 101 suddenly changes, the oxygen concentration in the reference gas chamber 102 also suddenly changes as a result of the oxygen in the exhaust gas being discharged into the reference gas chamber 102 by the pump cell 13. FIG. 4 shows an aspect of changes in the oxygen concentration in the reference gas chamber 102 by a graph.

Here, positions P1 to P4 in FIG. 4 correspond to positions P1 to P4 shown in FIG. 1. That is, the position P1 corresponds to a position in the pump cell 13 of an end portion that is closest to the introduction hole 103. The position P2 corresponds to a position in the pump cell 13 of an end portion that farthest from the introduction hole 103. The position P3 corresponds to a position in the sensor cell 14 of an end portion that is closest to the pump cell 13. The position P4 corresponds to a position in the sensor cell 14 of an end portion that is farthest from the pump cell 13. Hereafter, an area from the position P1 to the position P2 in the reference gas chamber 102, that is, an area in which the pump cell 13 is arranged is referred to as a pump-cell area AP. In addition, an area from the position P3 to the position P4 in the reference gas chamber 102, that is, an area in which the sensor cell 14 is arranged is referred to as a sensor-cell area AS.

Furthermore, in FIG. 4, an oxygen concentration Cb indicates an oxygen concentration in atmospheric air. The oxygen concentration in the reference gas chamber 102 is ordinarily the oxygen concentration Cb in atmospheric air.

As shown in FIG. 4, when the oxygen concentration in the exhaust gas that is introduced into the measurement chamber 101 suddenly changes, first, the oxygen concentration in the reference gas chamber 102 changes as indicated by a single-dot chain line L1. That is, because the oxygen is discharged into the reference gas chamber 102 by the pump cell 13, the oxygen concentration in the pump-cell area AP of the reference gas chamber 102 increases to Cb+a that is higher than the oxygen concentration Cb in atmospheric air by a predetermined value a. At this time, the oxygen concentration in the sensor-cell area As of the reference gas chamber 102 is the oxygen concentration Cb in atmospheric air.

Subsequently, as a result of the oxygen that is present in the pump-cell area AP of the reference gas chamber 102 flowing into the sensor-cell area AS, as indicated by a solid line L2 in FIG. 4, the oxygen concentration in the sensor cell area AS also increases to Cb+a. Subsequently, the oxygen concentration in the reference gas chamber 102 stabilizes at Cb+a. Such changes in the oxygen concentration in the reference gas chamber 102 are factor in changes occurring the detected value of the sensor current Is detected by the control circuit 20.

Specifically, when the oxygen concentration in the reference gas chamber 102 is held at the oxygen concentration Cb in atmospheric air, the electromotive force that is generated in the sensor cell 14 is a substantially fixed value. Therefore, an effective voltage that is actually applied to the sensor cell 14 is a value that is obtained by the electromotive force of the sensor cell 14 being subtracted from the sensor voltage Vs.

Figure 5:
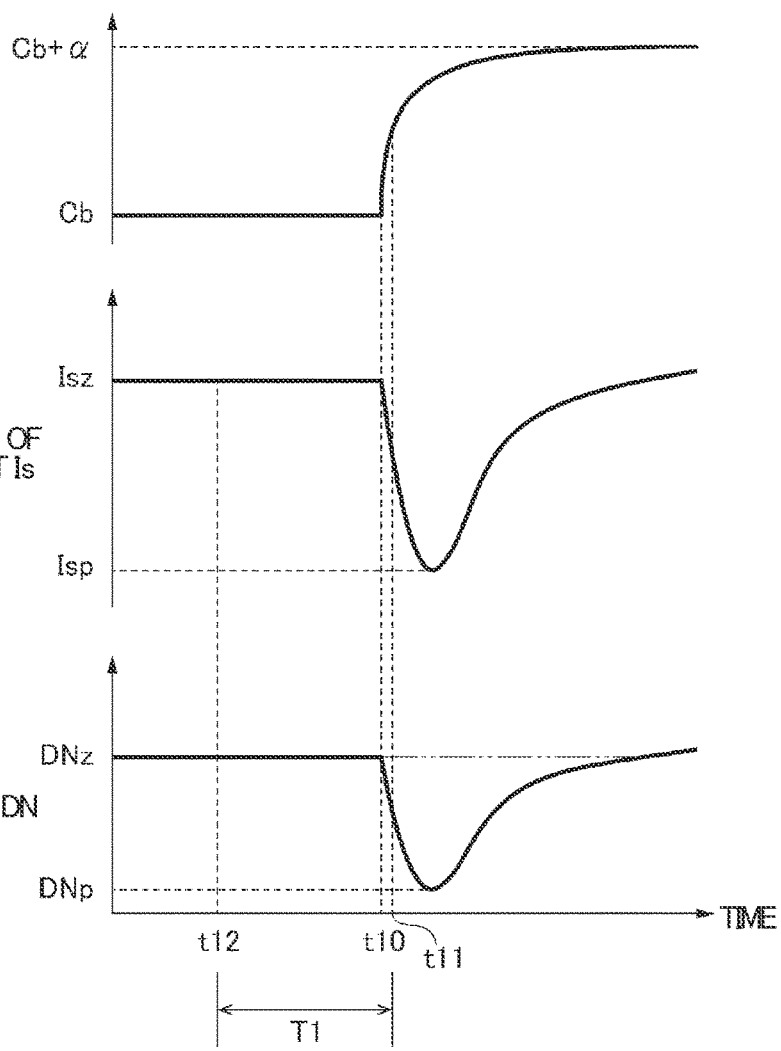
FIGS. 5A, 5B and 5C are timing charts respectively illustrating transitions in the oxygen concentration in the reference gas chamber, a detected value of a sensor current, and a detected value of NOX concentration.

In contrast, as shown in FIG. 5A, for example, when the oxygen concentration in the reference gas chamber 102 start to increase at time t10, changes occur in the electromotive force in the sensor cell 14. Changes also occur in the effective voltage of the sensor cell 14 in accompaniment with the changes in the electromotive force in the sensor cell 14. In the sensor cell 14, electric charge that is based on electrostatic capacitances of the sensor electrode 140 and the common electrode 17 is stored between the sensor electrode 140 and the common electrode 17.

Therefore, when changes occur in the effective voltage of the sensor cell 14, changes also occur in the electric charge that is stored between the sensor electrode 140 and the common electrode 17. As a result of such changes in the electric charge of the sensor cell 14, a current that is based on a change amount of electric charge flows to the sensor cell 14. As a result, as shown in FIG. 5B, subsequent to time t10, the detected value of the sensor current Is changes so as to increase after temporarily decreasing from a reference value Isz to a negative peak value Isp. The reference value Isz is the detected value of the sensor current Is immediately before the oxygen concentration in the reference gas chamber 102 changes.

As a result of the detected value of the sensor current Is suddenly changing as shown in FIG. 5B, changes such as that shown in FIG. 5C also occur in the detected value of $NO_X$ concentration DN that is calculated based on the detected value of the sensor current Is. That is, the detected value of the $NO_X$ concentration DN also changes so as to increase after temporarily decreasing from a reference value DNz to a negative peak value DNp. At this time, as indicated by a two-dot chain line in FIG. 5C, the detected value of $NO_X$ concentration DN suddenly changes regardless of the actual $NO_X$ concentration in the exhaust gas not having changed from the reference value DNz. Therefore, the $NO_X$ concentration in the exhaust gas is erroneously detected.

Here, in the control circuit 20 of the gas sensor 1 according to the present embodiment, when a change that has occurred the oxygen concentration in the reference gas chamber 102 is detected, the detected value of the sensor current Is is corrected and the detected value of $NO_X$ concentration DN is calculated based on the detected value of the sensor current Is after correction.

Figure 6:
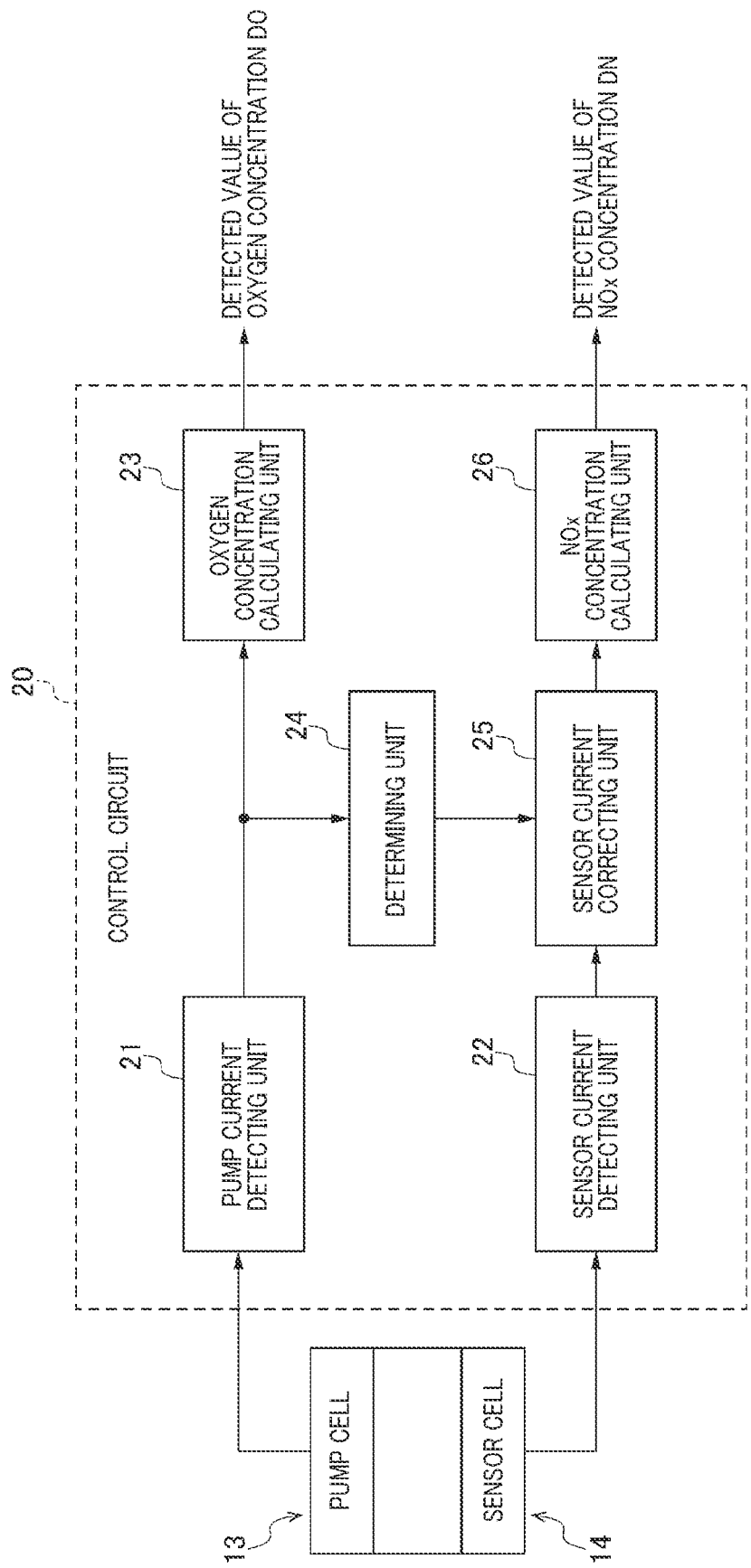
FIG. 6 is a block diagram illustrating a configuration of a control circuit of the gas sensor according to the first embodiment.

Specifically, as shown in FIG. 6, the control circuit 20 includes a pump current detecting unit 21, a sensor current detecting unit 22, an oxygen concentration calculating unit 23, a determining unit 24, a sensor current correcting unit 25, and an $NO_X$ concentration calculating unit 26.

The pump current detecting unit 21 detects the pump current Ip that is outputted from the pump cell 13 and outputs the detected value of the pump current Ip to the oxygen concentration calculating unit 23 and the determining unit 24. According to the present embodiment, the pump current detecting unit 21 corresponds to a first current detecting unit. The detected value of the pump current Ip corresponds to the detected value of the first current.

The oxygen concentration calculating unit 23 calculates the detected value of oxygen concentration DO from the detected value of the pump current Ip that is outputted from the pump current detecting unit 21 using a calculation expression and outputs the calculated detected value of oxygen concentration DO.

The determining unit 24 determines whether a change has occurred in the oxygen concentration in the reference gas chamber 102 based on the detected value of the pump current Ip. Specifically, when detected that a change with time of the detected value of the pump current Ip is equal to or greater than a predetermined value, the determining unit 24 determines that a change has occurred in the oxygen concentration in the reference gas chamber 102. When determined that a change has occurred in the oxygen concentration in the reference gas chamber 102, the determining unit 24 notifies the sensor current correcting unit 25 thereof.

The sensor current detecting unit 22 detects the sensor current Is that is outputted from the sensor cell 14 and outputs the detected detected value of the sensor current Is to the sensor current correcting unit 25. According to the present embodiment, the sensor current detecting unit 22 corresponds to a second current detecting unit. The detected value of the sensor current Is corresponds to a detected value of the second current.

When not notified by the determining unit 24 that a change has occurred in the oxygen concentration in the reference gas chamber 102, the sensor current correcting unit 25 outputs the detected value of the sensor current Is outputted from the sensor current detecting unit 22 to the $NO_X$ concentration calculating unit 26 as is. Meanwhile, when notified by the determining unit 24 that a change has occurred in the oxygen concentration in the reference gas chamber 102, the sensor current correcting unit 25 corrects the detected value of the sensor current Is outputted from the sensor current detecting unit 22 and outputs a detected value of the sensor current Isc after correction to the $NO_X$ concentration calculating unit 26.

The $NO_X$ concentration calculating unit 26 calculates the detected value of $NO_X$ concentration DN by multiplying the detected value of the sensor current Is or the detected value of the sensor current Isc after correction that is outputted from the sensor current correcting unit 25 by a conversion factor B, and outputs the calculated detected value of $NO_X$ concentration DN.

Next, the steps in a process that is performed by the determining unit 24 and the sensor current correcting unit 25 will be described in detail with reference to FIG. 7. Here, in the process shown in FIG. 7, an initial value of a flag F is set to 0. In addition, the process shown in FIG. 7 is repeatedly performed at a predetermined calculation cycle.

Figure 7:
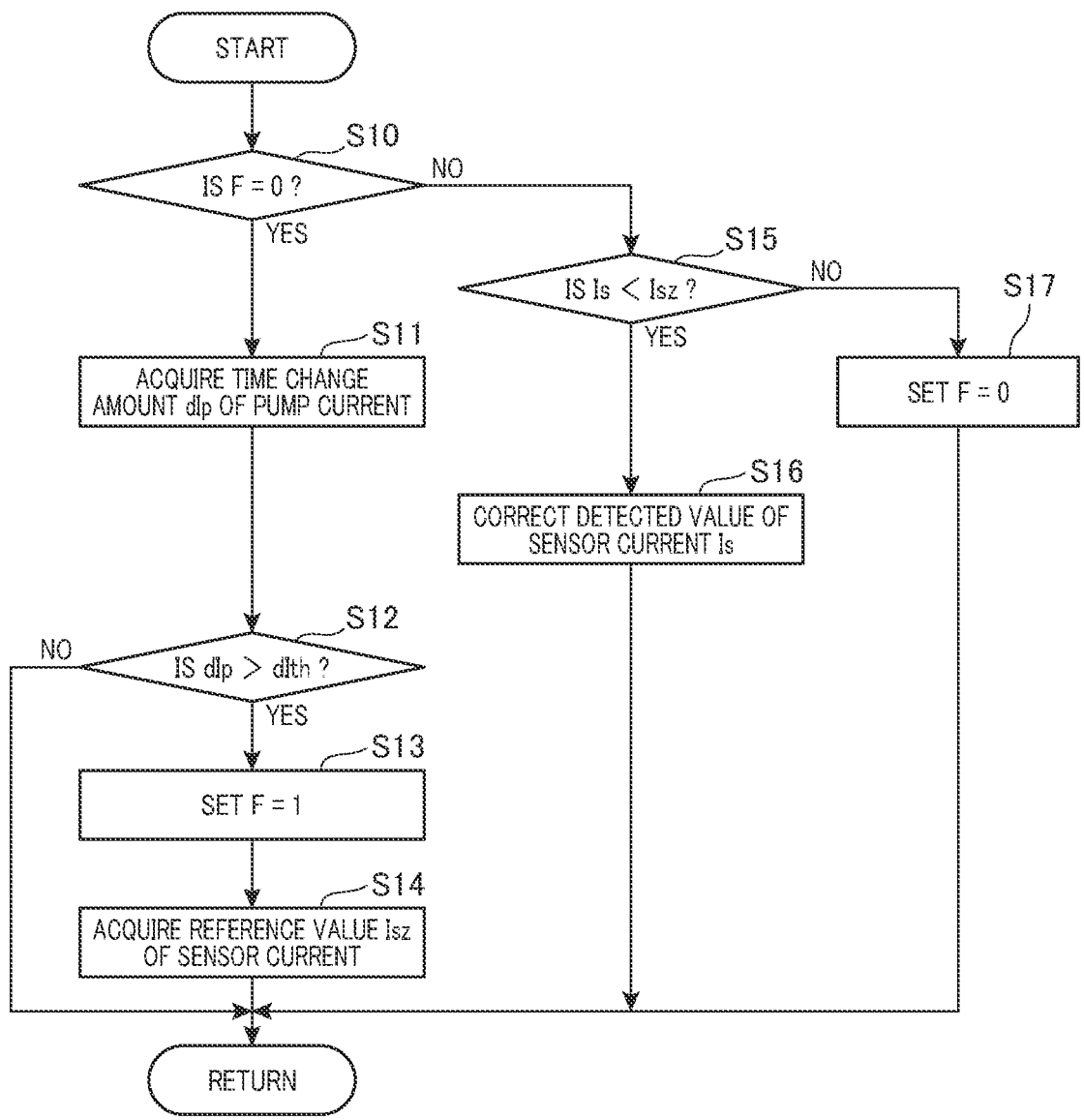
FIG. 7 is a flowchart illustrating the steps in a process performed by the control circuit of the gas sensor according to the first embodiment.

As shown in FIG. 7, first, as a process at step S10, the sensor current correcting unit 25 determines whether the value of the flag F is 0. When an affirmative determination is made in the process at step S10, that is, when the value of the flag F is 0, the sensor current correcting unit 25 determines that the detected value of the sensor current Is is not required to be corrected. In this case, as a process at step S11 following step S10, the determining unit 24 acquires a change amount dIp per unit time of the detected value of the pump current Ip. Specifically, the determining unit 24 calculates the change with time dIp of the detected value of the pump current based on the detected value of the pump currents Ip that are detected during a period from the present to a predetermined time prior.

As a process at step S12 following step S11, the determining unit 24 determines whether the change with time dIp of the detected value of the pump current is equal to or greater than a predetermined value dIth. The predetermined value dIth is determined in advance through experiments and the like so as to enable determination regarding whether the detected value of the pump current Ip has suddenly changed. The predetermined value dIth is stored in a storage apparatus of the control circuit 20. According to the present embodiment, the process at step S12 corresponds to a process for determining whether the change with time dIp of the detected value of the pump current is outside a predetermined range.

When a negative determination is made in the process at step S12, that is, when the change with time dIp of the detected value of the pump current is equal to or less than the predetermined value dIth, the determining unit 24 determines that a change has not occurred in the oxygen concentration in the reference gas chamber 102 and ends the series of processes.

Meanwhile, when an affirmative determination is made in the process at step S12, that is, when the change with time dIp of the detected value of the pump current exceeds the predetermined value dIth, the determining unit 24 determines that a change has occurred in the oxygen concentration in the reference gas chamber 102. In this case, as a process at step S13, the determining unit 24 sets the flag F to 1. In the process shown in FIG. 7, the process in which the flag F is set to 1 corresponds to a process in which the sensor current correcting unit 25 is notified that a change has occurred in the oxygen concentration in the reference gas chamber 102.

As a process at step S14 following step S13, the sensor current correcting unit 25 acquires the reference value Isz of the sensor current. For example, when the oxygen concentration in the reference gas chamber 102 changes as shown in FIG. 5A, a timing at which the change with time dIp of the detected value of the pump current is determined to exceed the predetermine value dIth is time t11 immediately after time t10. In this case, the sensor current Is that is detected by the sensor current detecting unit 22 at time t12 that is a predetermined time T1 before time t11 is acquired as the reference value Isz of the sensor current Is. As shown in FIG. 7, the sensor current correcting unit 25 temporarily ends the process shown in FIG. 7 after performing the process at step S14.

Subsequently, when the process shown in FIG. 7 is performed again after elapse of a predetermined calculation cycle, because the flag F is set to 1, the sensor current correcting unit 25 makes a negative determination in the process at step S10. In this case, as a process at step S15, the sensor current correcting unit 25 determines whether the detected value of the sensor current Is is less than the reference value Isz. When an affirmative determination is made in the process at step S15, that is, when the detected value of the sensor current Is is less than the reference value Isz, the sensor current correcting unit 25 corrects the detected value of the sensor current Is as a process at step S16.

Specifically, the sensor current calculating unit 25 calculates the detected value of the sensor current Isc after correction by correcting the detected value of the sensor current Is based on expression f1, below.

$$Isc=Isz+(Is-Isz)\times K \tag{f1}$$

Here, a correction factor K is prescribed in advance. The correction factor K is set during a calibration inspection that is performed after manufacturing of the gas sensor 1. In the calibration inspection, inspection of an output value of the gas sensor 1 and the like are performed by a gas for inspection being introduced into the gas sensor 1.

When the correction factor K is determined, first, transitions in the detected value of the sensor current Is such as those shown in FIG. 5B are acquired by the oxygen concentration in the gas for inspection that is introduced into the gas sensor 1 being changed in an environment in which the $NO_X$ concentration is set in a fixed manner or in an environment in which the $NO_X$ concentration is set to zero. As a result, the reference value Isz and the negative peak value Isp are acquired. The correction factor K is set based on expression (f2), below, from the reference value Isz and the negative peak value Isp that are acquired during the calibration inspection in the foregoing manner.

$$K=a\times Isp/Isz \tag{f2}$$

Here, "a" is an adjustment factor and arbitrarily set. The correction factor K that is set during the calibration inspection in this manner is stored in the storage apparatus of the control circuit 20. In the process at step S16 shown in FIG. 7, the sensor current correcting unit 25 calculates the detected value of the sensor current Isc after correction by above-described expression f1 using the correction factor K stored in the storage apparatus, and outputs the calculated detected value of the sensor current Isc after correction to the $NO_X$ concentration calculating unit 26.

Subsequently, because the process at step S16 is performed at a predetermined cycle during a period in which the detected value of the sensor current Is is less than the reference value Isz, correction of the detected value of the sensor current Iz is continuously performed.

When the detected value of the sensor current Is becomes equal to or greater than the reference value Isz, the sensor current correcting unit 25 makes a negative determination at step S15. As a result, in a process at step S17, the determining unit 24 sets the flag F to 0. The process at step S16 is subsequently no longer performed. That is, the sensor current correcting unit 25 outputs the detected value of the sensor current Is to the $NO_X$ concentration calculating unit 26 as is, without performing correction of the detected value of the sensor current Is.

As a result of the gas sensor 1 according to the present embodiment described above, workings and effects described in (1) to (4) below can be obtained.

(1) The detected value of the sensor current Is is corrected when a change occurs in the oxygen concentration in the reference gas chamber 102. This makes it possible to reduce an influence of changes in the oxygen concentration in the reference gas chamber 102 on the detected value of sensor current Is. The detected value of $NO_X$ concentration DN is calculated based on the detected value of the sensor current Isc after correction. Thus, the $NO_X$ concentration can be detected with higher accuracy.

(2) The determining unit 24 determines that a change has occurred in the oxygen concentration in the reference gas chamber 102 based on the change with time dIp of the detected value of the pump current being outside a predetermined range. As a result of a configuration such as this, whether a change has occurred in the oxygen concentration in the reference gas chamber 102 can be easily determined.

(3) The sensor current correcting unit 25 has, in advance, the correction factor K that is based on the change amount of the detected value of the sensor current Is when the oxygen concentration in the reference gas chamber 102 suddenly changes, such as that shown in above-described expression f2. When the detected value of the sensor current Is is corrected, the sensor current correcting unit 25 corrects the detected value of the sensor current Is using the correction factor K.

As a result of a configuration such as this, the detected value of the sensor current Is can be easily corrected. In addition, because the correction factor K is individually set during the calibration inspection of each gas sensor 1, calculation error regarding the detected value of $NO_X$ concentration DN attributed to individual differences in the gas sensors 1 can be reduced.

(4) The sensor current correcting unit 25 acquires the detected value of the sensor current Is that is detected by the sensor current detecting unit 22 immediately before the determining unit 24 determines that a change has occurred in the oxygen concentration in the reference gas chamber 102 as the reference value Isz. In addition, the sensor current correcting unit 25 performs correction during a period in which the detected value of the sensor current Is is less than the reference value Isz, after the determining unit 24 has determined that a change has occurred in the oxygen concentration in the reference gas chamber 102.

As a result of a configuration such as this, because the detected value of the sensor current Is is corrected during a period in which the changes in the oxygen concentration in the reference gas chamber 102 affect the detected value of the sensor current Is, detection error regarding the detected value of $NO_X$ concentration can be suppressed at a more appropriate timing.

(Modification)

Next, a modification of the gas sensor 1 according to the first embodiment will be described.

Figure 8:
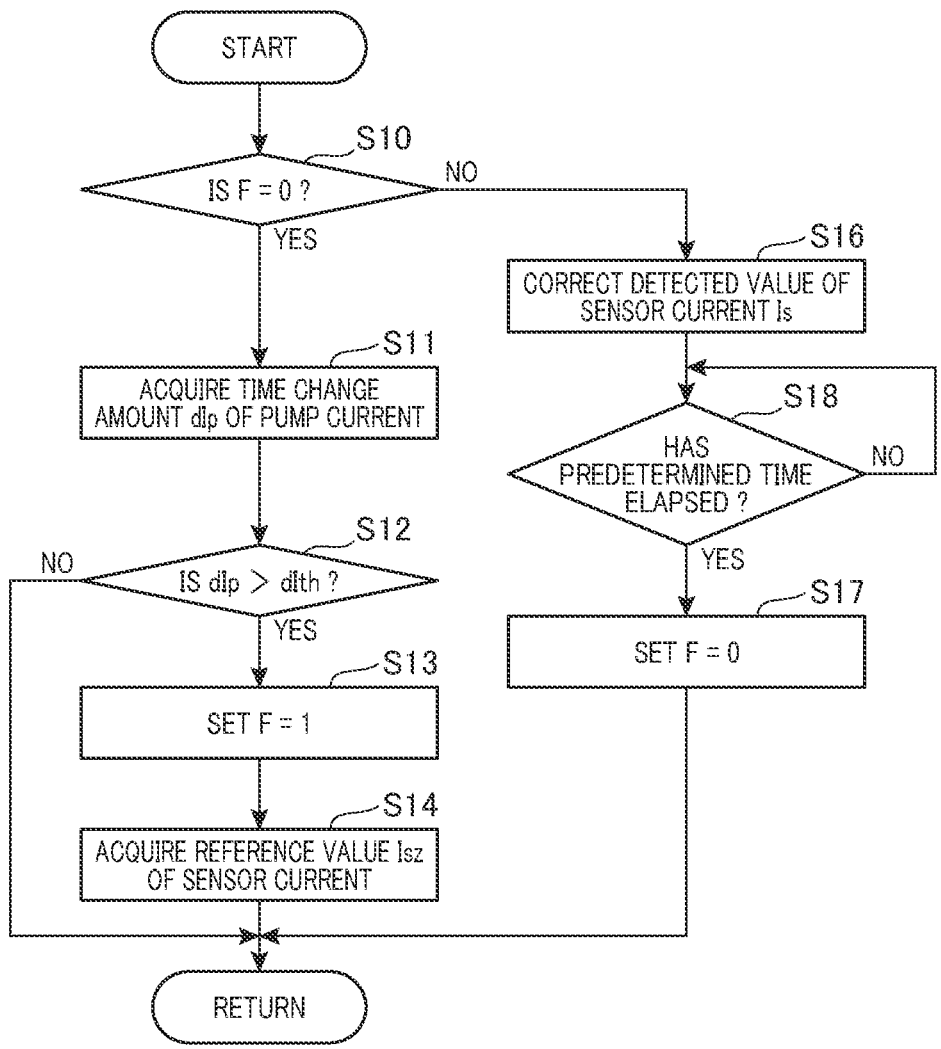
FIG. 8 is a flowchart illustrating the steps in a process performed by the control circuit of the gas sensor in a modification according to the first embodiment.

As shown in FIG. 8, in the gas sensor 1 of the present modification, when a negative determination is made in the process at step S10, the sensor current correcting unit 25 corrects the detected value of the sensor current Is as the process at step S16. Next, the sensor current correcting unit 25 determines whether a predetermined time has elapsed from when the flag F is set to 1 as the process at step S18.

Subsequently, when the predetermined time has elapsed from when the flag F is set to 1, the sensor current correcting unit 25 makes an affirmative determination in the process at step S18. As a result, the determining unit 24 sets the flag F to 0 as the process at step S17. As a result of the flag F being set to 0, the sensor current correcting unit 25 outputs the detected value of the sensor current Is to the $NO_X$ concentration calculating unit 26 as is, without performing correction of the detected value of the sensor current Is.

As a result of a configuration such as this, correction of the detected value of the sensor current Is is performed during a period until the predetermined time elapses from when the flag F is set to 1, that is, when a change is determined to have occurred in the oxygen concentration in the reference gas chamber 102. Consequently, as a result of a length of the predetermined time being adjusted as appropriate, detection error regarding the detected value of $NO_X$ concentration DN can be more appropriately suppressed.

Second Embodiment

Next, a second embodiment of the gas sensor 1 will be described. Hereafter, differences with the gas sensor 1 according to the first embodiment will mainly be described.

In cases in which the oxygen in the exhaust gas that is introduced into the measurement chamber 101 cannot be completely removed by the pump cell 13, the residual oxygen may come into contact with the sensor electrode 140. In such cases, the sensor current Is that is based not only on the $NO_X$ concentration but also on a concentration of the residual oxygen flows to the sensor cell 14. Therefore, an error occurs in the $NO_X$ concentration that is calculated based on the sensor current Is.

Figure 9:
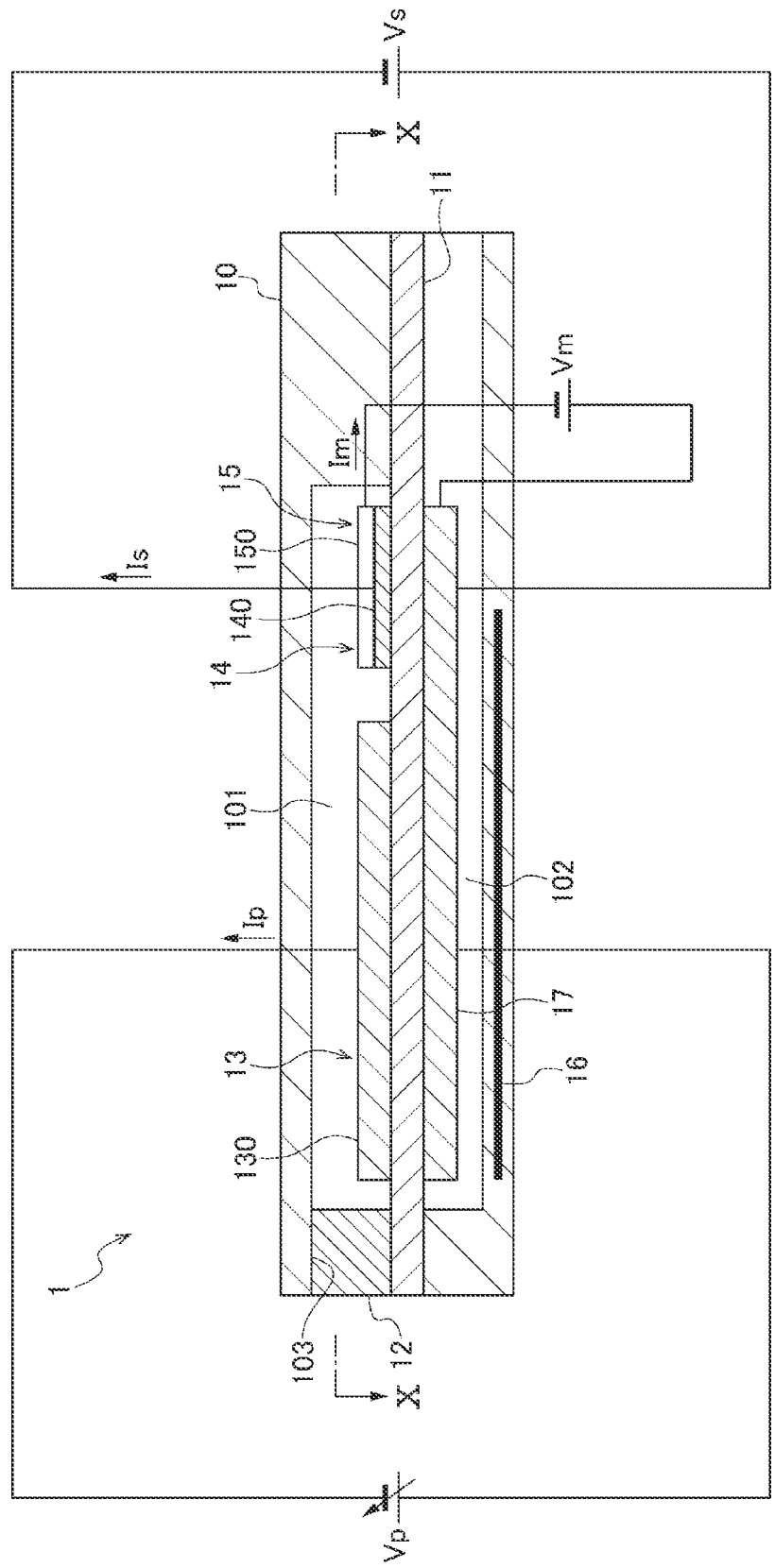
FIG. 9 is a cross-sectional view of a structure of a gas sensor according to a second embodiment.
Figure 10:
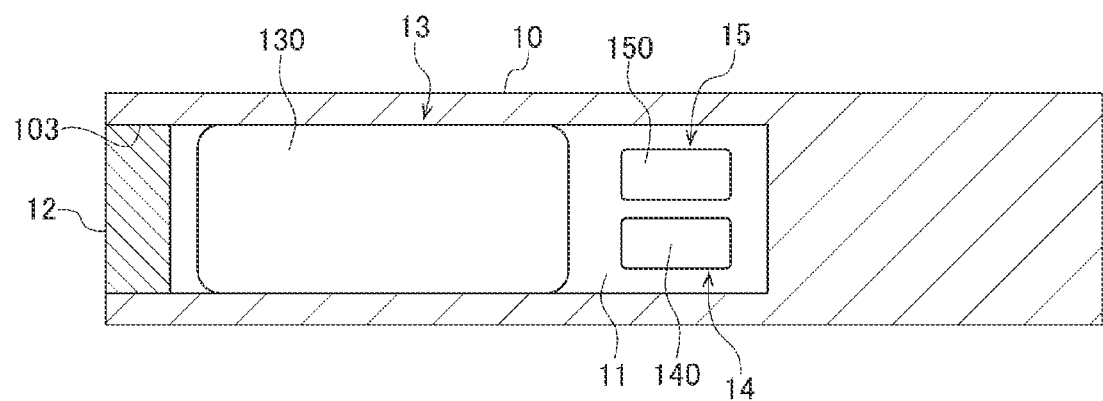
FIG. 10 is a cross-sectional view of a structure taken along line X-X in FIG. 9.

Here, as shown in FIG. 9 and FIG. 10, the gas sensor 1 according to the present embodiment further includes a monitor cell 15 for detecting the residual oxygen in the exhaust gas, in addition to the pump cell 13 and the sensor cell 14. The monitor cell 15 is arranged so as to be in line with the sensor cell 14.

As shown in FIG. 9, the monitor cell 15 is configured by the solid electrolyte body 11, a monitor electrode 150 that is arranged on the surface of the solid electrolyte body 11 on the measurement chamber 101 side, and the common electrode 17. The monitor electrode 150 is configured by an $NO_X$ inactive electrode that does not easily decompose $NO_X$, such as an electrode that is composed of a Pt—Au (platinum-gold) alloy. A monitor voltage Vm is applied between the monitor electrode 150 and the common electrode 17. According to the present embodiment, the monitor cell 15 corresponds to a third cell. The monitor electrode 150 corresponds to a fifth electrode. The common electrode 17 corresponds to a sixth electrode.

The exhaust gas from which oxygen has been removed by the pump electrode 130 comes into contact with the monitor electrode 150. As a result of the residual oxygen in the exhaust gas coming into contact with the monitor electrode 150, oxygen ions are generated in the monitor electrode 150. The oxygen ions flow inside the solid electrolyte body 11 towards the common electrode 17, release electric charge in the common electrode 17, and become oxygen. The oxygen is released into the atmosphere from the reference gas chamber 102. A monitor current Im flows between the monitor electrode 150 and the common electrode 17 based on a flow of electric charge at this time. Therefore, the monitor current Im indicates a value that is based on the concentration of residual oxygen in the exhaust gas. According to the present embodiment, the monitor current Im corresponds to a third current.

As indicated by a broken line in FIG. 3, the monitor current Im that is outputted from the monitor cell 15 is taken into the control circuit 20. The control circuit 20 detects the monitor current Im that is outputted from the monitor cell 15. A detected value of the monitor current Im detected by the control circuit 20 has a correlation with the concentration of residual oxygen in the exhaust gas. In addition, the detected value of the sensor current Is detected by the control circuit 20 has a correlation with the $NO_X$ concentration and the residual oxygen in the exhaust gas. Using the foregoing, the control circuit 20 subtracts the detected value of the monitor current Im from the detected value of the sensor current Is, and detects the $NO_X$ concentration in the exhaust gas based on the subtracted value.

Figure 11:
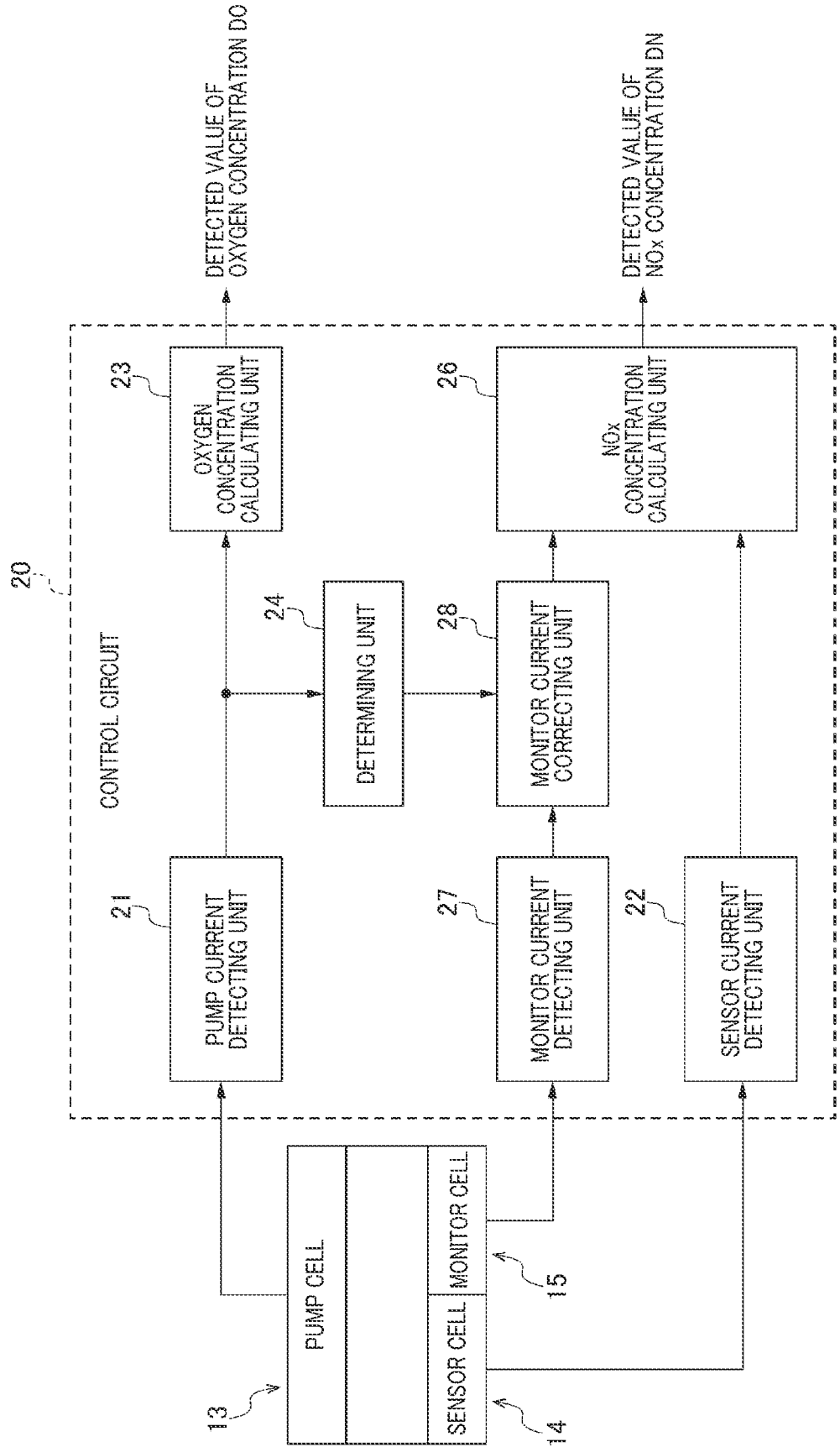
FIG. 11 is a block diagram illustrating a configuration of a control circuit of the gas sensor according to the second embodiment.

Specifically, as shown in FIG. 11, the control circuit 20 includes a monitor current detecting unit 27. In addition, the control circuit 20 includes a monitor current correcting unit 28 instead of the sensor current correcting unit 25.

The monitor current detecting unit 27 detects the monitor current Im that is outputted from the monitor cell 15 and outputs the detected detected value of the monitor current Im to the monitor current correcting unit 27. According to the present embodiment, the monitor current detecting unit 23 corresponds to a third current detecting unit. The detected value of the monitor current Im corresponds to the detected value of third current.

When not notified by the determining unit 24 that a change has occurred in the oxygen concentration in the reference gas chamber 102, the monitor current correcting unit 28 outputs the detected value of the monitor current Im outputted from the monitor current detecting unit 27 to the $NO_X$ concentration calculating unit 26 as is. Meanwhile, when notified by the determining unit 24 that a change has occurred in the oxygen concentration in the reference gas chamber 102, the monitor current correcting unit 28 corrects the detected value of the monitor current Im outputted from the monitor current detecting unit 27 and outputs a detected value of the monitor current Imc after correction to the $NO_X$ concentration calculating unit 26.

The $NO_X$ concentration calculating unit 26 calculates a subtracted value that is obtained by subtracting the monitor current Im from the detected value of the sensor current Is, or a subtracted value that is obtained by subtracting the detected value of the monitor current Imc after correction from the detected value of the sensor current Is. The $NO_X$ concentration calculating unit 26 calculates the detected value of $NO_X$ concentration DN by multiplying the subtracted value by the conversion factor B, and outputs the calculated detected value of $NO_X$ concentration DN.

Figure 12:
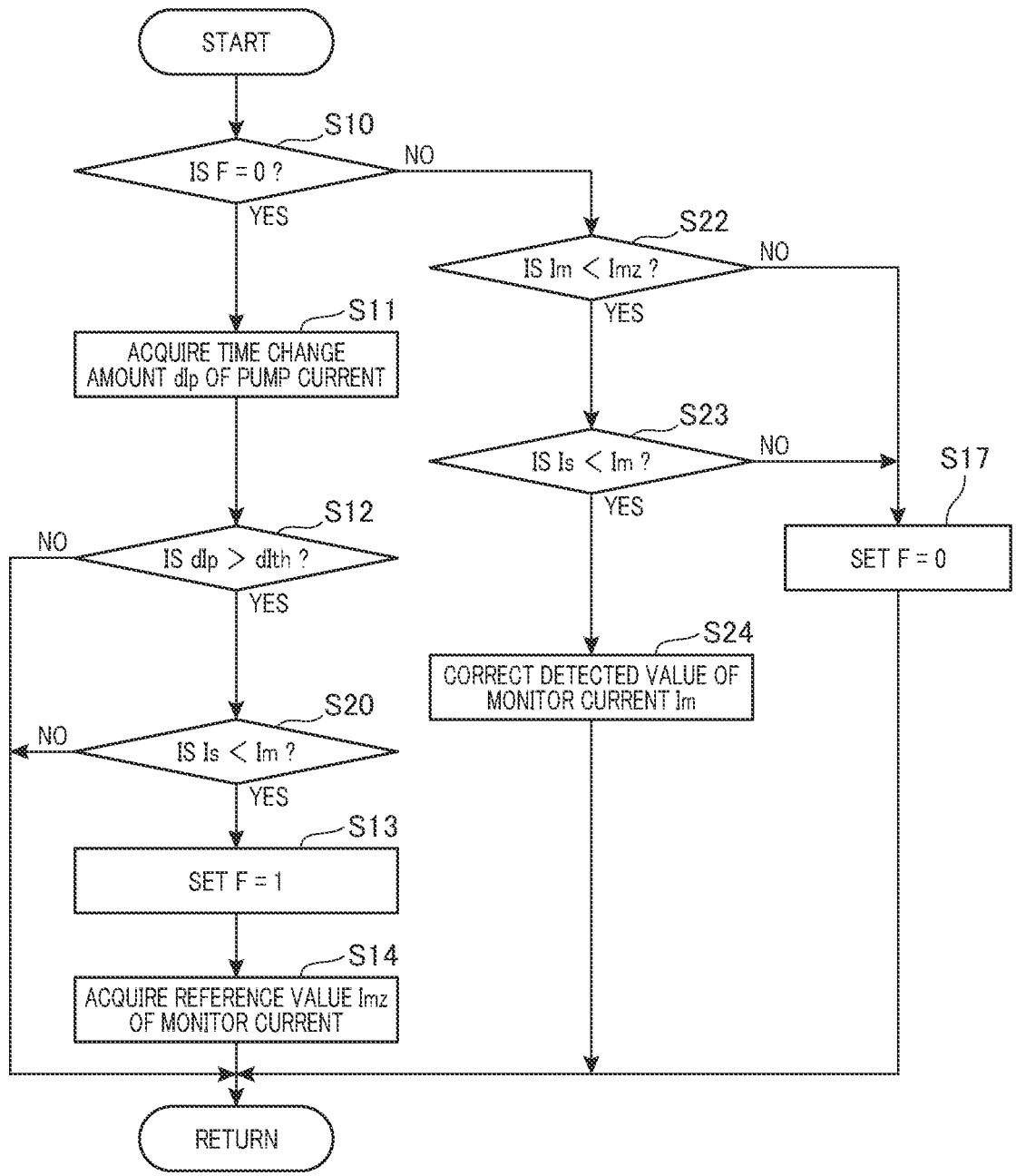
FIG. 12 is a flowchart illustrating the steps in a process performed by the control circuit of the gas sensor according to the second embodiment.

Next, the steps in a process that is performed by the determining unit 24 and the monitor current correcting unit 28 will be described in detail with reference to FIG. 12. Here, in the process shown in FIG. 12, the initial value of the flag F is set to 0. In addition, the process shown in FIG. 12 is repeatedly performed at a predetermined calculation cycle. In the process shown in FIG. 12, processes that are identical to those shown in FIG. 7 are given the same reference numbers. Redundant descriptions are thereby omitted.

As shown in FIG. 12, when an affirmative determination is made in the process at step S12, that is, when the change with time dIp of the detected value of the pump current exceeds the predetermined value dIth, the determining unit 24 determines whether the detected value of the sensor current Is is less than the detected value of the monitor current Im as a process at step S20.

As shown in FIGS. 13A and 13B, for example, when the oxygen concentration in the reference gas chamber 102 starts to increase at time t10, changes occur in the detected value of the monitor current Im based on principles similar to those of the sensor cell 14. Specifically, as a result of the electromotive force in the monitor cell 15 changing in accompaniment with the change in the oxygen concentration in the reference gas chamber 102, subsequent to time t10, the monitor current Im increases after temporarily decreasing from a reference value Imz to a negative peak value Imp. The reference value Imz is the monitor current Im immediately before the oxygen concentration in the reference gas chamber 102 changes. As a result of the detected value of the sensor current Is and the detected value of the monitor current Im changing as shown in FIG. 13B, the detected value of $NO_X$ concentration DN calculated therefrom changes as shown in FIG. 13C.

As shown in FIG. 13B, the detected value of the sensor current Is ordinarily indicates a value that is greater than the detected value of the monitor current Im. However, when the detected values Is and Im change as a result of changes in the oxygen concentration in the reference gas chamber 102, the detected value of the sensor current Is indicates a value that is less than the detected value of the monitor current Im.

Subsequently, as the oxygen concentration in the reference gas chamber 102 converges at Cb+α, the detected value of the sensor current Is indicates a value that is greater than the detected value of the monitor current Im. Therefore, when the detected value of the sensor current Is is less than the detected value of the monitor current Im, the oxygen concentration in the reference gas chamber 102 can be determined to be in an increasing state.

As shown in FIG. 12, when an affirmative determination is made in the process at step S20, that is, when the detected value of the sensor current Is is less than the detected value of the monitor current Im, the determining unit 24 determines that the oxygen concentration in the reference gas chamber has changed. In this case, the determining unit 24 sets the flag F to 1 as the process at step S13.

As a process at step S21 following step S13, the monitor current correcting unit 28 acquires the reference value Imz of the monitor current. For example, when the oxygen concentration in the reference gas chamber 102 changes as shown in FIG. 13A, the detected value of the monitor current Im that is detected by the monitor current detecting unit 27 at time t12 that is a predetermined time T1 before time t11 is acquired as the reference value Imz of the monitor current. The monitor current correcting unit 28 temporarily ends the process shown in FIG. 12 after performing the process at step S21.

Subsequently, when the process shown in FIG. 7 is performed again after elapse of a predetermined calculation cycle, because the flag F is set to 1, the monitor current correcting unit 28 makes an affirmative determination in the process at step S10. In this case, in a process at step S22, the monitor current correcting unit 28 determines whether the detected value of the monitor current Im is less than the reference value Imz.

When an affirmative determination is made in the process at step S22, that is, when the detected value of the monitor current Im is less than the reference value Imz, the monitor current correcting unit 28 determines whether the detected value of the sensor current Is is less than the detected value of the monitor current Im as a process at step S23. When an affirmative determination is made in the process at step S23, that is, when the detected value of the sensor current Is is less than the detected value of the monitor current Im, the monitor current correcting unit 28 corrects the detected value of the monitor current Im as a process at step S24.

Specifically, the monitor current correcting unit 28 calculates a detected value of the monitor current Imc after correction by correcting the detected value of the monitor current Im based on expression f3, below.

$$Imc = Imz + (Im - Imz) \times Km \quad (f3)$$

Here, a correction factor Km is prescribed in advance. The correction factor K is set during the calibration inspection that is performed after manufacturing of the gas sensor 1. When the correction factor Km is determined, first, transitions in the detected value of the sensor current Is and the detected value of the monitor current Im such as those shown in FIG. 13B are acquired by the oxygen concentration in the gas for inspection that is introduced into the gas sensor 1 being changed in an environment in which the $NO_X$ concentration is set to zero. The correction factor Km is set based on expression (f4), below, from the detected value of the sensor current Is and the detected value of the monitor current Im that are acquired during the calibration inspection in the foregoing manner.

$$Km = a \times Is/Im \quad (f4)$$

Here, "a" is an adjustment factor and arbitrarily set. The correction factor Km that is set during the calibration inspection in this manner is stored in the storage apparatus of the control circuit 20. In a process at step S24 shown in FIG. 12, the monitor current correcting unit 28 calculates the detected value of the monitor current Imc after correction by above-described expression f30 using the correction factor Km stored in the storage apparatus, and outputs the calculated detected value of the monitor current Imc after correction to the $NO_X$ concentration calculating unit 26.

Subsequently, when the detected value of the monitor current Im becomes equal to or greater than the reference value Imz, the monitor current correcting unit 28 makes a negative determination in the process at step S22. In addition, when the detected value of the sensor current Is is equal to or greater than the detected value of the monitor current Im, the monitor current correcting unit 28 makes a negative determination in the process at step S23.

When the monitor current correcting unit 28 makes the negative determination in the process at step S22 or makes the negative determination in the process at step S23, the determining unit 24 sets the flag F to 0 as step S17. The process at step S24 is subsequently no longer performed. That is, because the correction of the detected value of the monitor current Im is not performed, the monitor current correcting unit 28 outputs the detected value of the monitor current Im to the $NO_X$ concentration calculating unit 26 as is.

As a result of the gas sensor 1 according to the present embodiment described above, in addition to the workings and effects described in (2) above according to the first embodiment, workings and effects described in (5) to (7) below can be obtained.

(5) The detected value of the monitor current Im is corrected when a change occurs in the oxygen concentration in the reference gas chamber 102. This makes it possible to reduce an influence of effects that the changes in the oxygen concentration in the reference gas chamber 102 on the detected value of the monitor current. The detected value of $NO_X$ concentration DN is calculated based on the detected value of the monitor current Imc after correction. Thus, the $NO_X$ concentration can be detected with higher accuracy.

(6) The monitor current correcting unit 28 has, in advance, the correction factor Km that indicates a relationship of an output ratio of the sensor cell 14 and the monitor cell 15 when the oxygen concentration in the reference gas chamber 102 suddenly changes, as shown in above-described expression f4, and corrects the detected value of the monitor current Im using the correction factor Km. As a result of a configuration such as this, the detected value of the monitor current Im can be easily corrected. In addition, because the correction factor Km is individually set during the calibration inspection of each gas sensor 1, calculation error regarding the detected value of $NO_X$ concentration DN attributed to individual differences in the gas sensors 1 can be reduced.

(7) The monitor current correcting unit 28 performs correction during a period until the detected value of the sensor current Is is determined to be equal to or greater than the detected value of the monitor current Im after the determining unit 24 determines that a change has occurred in the oxygen concentration in the reference gas chamber 102. As a result of a configuration such as this, because the detected value of the monitor current Im is corrected during a period in which the changes in the oxygen concentration in the reference gas chamber 102 affect the detected value of the monitor current Im, detection error regarding the detected value of $NO_x$ concentration DN can be suppressed at a more appropriate timing.

OTHER EMBODIMENTS

Here, the embodiments can also be carried out according to the modes below.

In the gas sensor 1 according to the second embodiment, instead of a method in which the detected value of the monitor current Im is corrected, the detected value of the sensor current Is may be corrected. In addition, the detected value of the monitor current Im and the detected value of the sensor current Is can both be corrected.

The monitor current correcting unit 28 according to the second embodiment may determine whether the oxygen concentration in the reference gas chamber 102 has reached a state of equilibrium as the process at step S23 shown in FIG. 12. For example, the monitor current correcting unit 28 can determine whether the oxygen concentration in the reference gas chamber 102 has reached a state of equilibrium by using the change with time dIp of the detected value of the pump current.

When the oxygen concentration in the reference gas chamber 102 has not reached a state of equilibrium, the monitor current correcting unit 23 makes an affirmative determination in the process at step S23, and corrects the detected value of the monitor current Im as the process at step S24. When the oxygen concentration in the reference gas chamber 102 has reached a state of equilibrium, the monitor current correcting unit 28 makes a negative determination in the process at step S23. In this case, the determining unit 24 sets the flag F to 0 as the process at step S17. Even in a configuration such as this, workings and effects identical or similar to those of the gas sensor 1 according to the second embodiment can be achieved.

The determining unit 24 according to the embodiments is that which detects a change in the oxygen concentration in the reference gas chamber 102 based on the change with time dIp of the detected value of the pump current, as shown in the process at step S12 in FIG. 7 and FIG. 12. However, the determining unit 24 according to the embodiments may detect a change in the oxygen concentration in the reference gas chamber 102 based on the detected value of the pump current Ip itself. Specifically, the determining unit 24 may determine that a change has occurred in the oxygen concentration in the reference gas chamber 102 based on the detected value of the pump current Ip being outside a predetermined range.

The gas sensor 1 according to the first embodiment may be that in which, instead of the common electrode 17, an electrode of the pump cell 13 and a reference electrode of the sensor cell 14 are separately provided. In addition, the gas sensor 1 according to the second embodiment may be that in which, instead of the common electrode 17, an electrode of the pump cell 13, an electrode of the sensor cell 14, and an electrode of the monitor cell 15 are separately provided.

The control circuit 20 and a control method thereof described in the present disclosure may be actualized by one or a plurality of dedicated computers that are provided so as to be configured by a processor and a memory, the processor being programmed to provide one or a plurality of functions that are realized by a computer program. The control circuit 20 and the control method thereof described in the present disclosure may be actualized by a dedicated computer that is provided so as to be configured by a processor that includes one or a plurality of dedicated hardware logic circuits.

The control circuit 20 and the control method thereof described in the present disclosure may be actualized by one or a plurality of dedicated computers that are configured by a combination of a processor that is programmed to provide one or a plurality of functions, a memory, and a processor that includes one or a plurality of hardware logic circuits. The computer program may be stored in a non-transitory computer-readable storage medium that can be read by a computer as instructions performed by the computer. The dedicated hardware logic circuit and the hardware logic circuit may be actualized by a digital circuit that includes a plurality of logic circuits or an analog circuit.

The present disclosure is not limited to the specific examples described above. The specific examples described above to which design changes have been made by a person skilled in the art are included in the scope of the present disclosure as long as characteristics of the present disclosure are included. Elements that are provided in the specific examples described above, as well as arrangements, conditions, shapes, and the like thereof are not limited to those given as examples and can be modified as appropriate. Combinations of the elements that are provided in the specific examples described above can be modified as appropriate as long as technical inconsistencies do not arise.

What is claimed is:
1. A gas sensor comprising:
  a measurement chamber into which exhaust gas is introduced;
  a reference gas chamber into which a reference gas is introduced;
  a first cell that includes a first electrode that is provided in the measurement chamber and a second electrode that is provided in the reference gas chamber, and removes oxygen that is contained in the exhaust gas that is introduced into the measurement chamber by a voltage being applied between the first electrode and the second electrode;
  a second cell that includes a third electrode that is provided in the measurement chamber and a fourth electrode that is provided in the reference gas chamber, in which a voltage is applied between the third electrode and the fourth electrode, and through which a second current flows which depends on a concentration of a specific gas component that is contained in the exhaust gas from which oxygen has been removed by the first cell; and
  a control circuit, wherein the control circuit is configured to:
  detect a value of a first current that flows between the first electrode and the second electrode;
  detect a value of the second current;
  calculate the concentration of the specific gas component based on a detected value of the second current detected by the control circuit;

determine whether a change has occurred in an oxygen concentration in the reference gas chamber based on a detected value of the first current detected by the control circuit; and correct the detected value of the second current when the control circuit determines that a change has occurred in the oxygen concentration in the reference gas chamber.

2. The gas sensor according to claim 1, wherein:
the control circuit is further configured to determine that a change has occurred in the oxygen concentration in the reference gas chamber based on a change with time of the detected value of the first current being outside a predetermined range.

3. The gas sensor according to claim 1, wherein:
the control circuit is further configured to determine that a change has occurred in the oxygen concentration in the reference gas chamber based on the detected value of the first current being outside a predetermined range.

4. The gas sensor according to claim 1, wherein:
the control circuit is provided with a correction factor that is based on a change amount of the detected value of the second current when the oxygen concentration in the reference gas chamber suddenly changes, and is further configured to correct the detected value of the second current using the correction factor when the detected value of the second current is corrected.

5. The gas sensor according to claim 1, wherein:
the control circuit is further configured to perform correction from when the control circuit determines that a change has occurred in the oxygen concentration in the reference gas chamber until elapse of a predetermined time.

6. The gas sensor according to claim 1, wherein:
the control circuit is configured to:
acquire, as a reference value, the detected value of the second current that is detected by the control circuit immediately before the control circuit determines that a change has occurred in the oxygen concentration in the reference gas chamber; and
perform correction during a period in which the detected value of the second current is less than the reference value after the control circuit determines that a change has occurred in the oxygen concentration in the reference gas chamber.

7. A gas sensor comprising:
a measurement chamber into which exhaust gas is introduced;
a reference gas chamber into which a reference gas is introduced;
a first cell that includes a first electrode that is provided in the measurement chamber and a second electrode that is provided in the reference gas chamber, and removes oxygen that is contained in the exhaust gas that is introduced into the measurement chamber by a voltage being applied between the first electrode and the second electrode;
a second cell that includes a third electrode that is provided in the measurement chamber and a fourth electrode that is provided in the reference gas chamber, in which a voltage is applied between the third electrode and the fourth electrode, and through which a second current flows which depends on a concentration of a specific gas component that is contained in the exhaust gas from which oxygen has been removed by the first cell;
a third cell that that includes a fifth electrode that is provided in the measurement chamber and a sixth electrode that is provided in the reference gas chamber, through which a third current flows which depend on a concentration of residual oxygen that is contained in the exhaust gas from which oxygen has been removed by the first cell by a voltage being applied between the fifth electrode and the sixth electrode; and a control circuit, wherein the control circuit is configured to:
detect a value of a first current that flows between the first electrode and the second electrode;
detect a value of the second current;
detect a value of the third current;
calculate the concentration of the specific gas component based on a detected value of the second current detected by the control circuit and a detected value of the third current detected by the control circuit;
determine whether a change has occurred in an oxygen concentration in the reference gas chamber based on a detected value of the first current detected by the control circuit; and
correct at least either of the detected value of the second current or the detected value of the third current when the control circuit determines that a change has occurred in the oxygen concentration in the reference gas chamber.

8. The gas sensor according to claim 7, wherein:
the control circuit is provided with a correction factor that indicates a relationship of an output ratio of the second cell and the third cell when the oxygen concentration in the reference gas chamber suddenly changes, and is further configured to correct at least either of the detected value of the second current or the detected value of the third current using the correction factor.

9. The gas sensor according to claim 7, wherein:
the control circuit is further configured to:
determine that a change has occurred in the oxygen concentration in the reference gas chamber based on a change with time of the detected value of the first current being equal to or greater than a predetermined value and the detected value of the second current being less than the detected value of the third current; and
perform correction during a period until the detected value of the second current is determined to be equal to or greater than the detected value of the third current or a period until the oxygen concentration in the reference gas chamber is determined to have reached a state of equilibrium, after the control circuit determines that a change has occurred in the oxygen concentration in the reference gas chamber.

10. The gas sensor according to claim 7, wherein:
the control circuit is further configured to determine that a change has occurred in the oxygen concentration in the reference gas chamber based on a change with time of the detected value of the first current being outside a predetermined range.

11. The gas sensor according to claim 7, wherein:
the control circuit is further configured to determine that a change has occurred in the oxygen concentration in the reference gas chamber based on the detected value of the first current being outside a predetermined range.

12. The gas sensor according to claim 7, wherein:
the control circuit is provided with, a correction factor that is based on a change amount of the detected value of the second current when the oxygen concentration in the reference gas chamber suddenly changes, and is configured to correct the detected value of the second current using the correction factor when the detected value of the second current is corrected.

13. The gas sensor according to claim 7, wherein:
the control circuit is further configured to perform correction from when the control circuit determines that a change has occurred in the oxygen concentration in the reference gas chamber until elapse of a predetermined time.

\* \* \* \* \*